United States Patent
Lin et al.

(10) Patent No.: US 8,690,459 B2
(45) Date of Patent: Apr. 8, 2014

(54) PROTECTION CAP FOR OPTICAL FIBER ADAPTER

(75) Inventors: Sung An Lin, Miaoli County (TW); Sung Chi Lin, Miaoli County (TW)

(73) Assignee: Ezontek Technologies Co., Ltd., Xinzhuang (TW)

( * ) Notice: Subject to any disclaimer, the term of this patent is extended or adjusted under 35 U.S.C. 154(b) by 197 days.

(21) Appl. No.: 13/422,056

(22) Filed: Mar. 16, 2012

(65) Prior Publication Data

US 2013/0108233 A1    May 2, 2013

(30) Foreign Application Priority Data

Oct. 27, 2011 (CN) .......................... 2011 1 0332114

(51) Int. Cl.
- *G02B 23/16* (2006.01)
- *H01R 4/22* (2006.01)
- *H01R 13/44* (2006.01)
- *H01R 39/27* (2006.01)

(52) U.S. Cl.
USPC ................. 385/93; 385/94; 385/92; 439/138; 439/607; 439/79

(58) Field of Classification Search
CPC ...... G02B 23/16; G02B 6/4442; G02B 6/387; G02B 6/3849; G02B 6/3816
USPC ............. 385/93, 94, 92; 439/138, 607, 79
See application file for complete search history.

(56) References Cited

U.S. PATENT DOCUMENTS

| | | | | |
|---|---|---|---|---|
| 5,506,922 A * | 4/1996 | Grois et al. | ...................... | 385/75 |
| 5,608,501 A * | 3/1997 | Makino | .......................... | 399/119 |
| 5,825,955 A * | 10/1998 | Ernst et al. | ........................ | 385/79 |
| 6,004,043 A * | 12/1999 | Abendschein et al. | .......... | 385/76 |
| 6,247,849 B1 * | 6/2001 | Liu | ................................. | 385/55 |
| 6,264,374 B1 * | 7/2001 | Selfridge et al. | ................. | 385/78 |
| 6,352,375 B1 * | 3/2002 | Shimoji et al. | ................... | 385/92 |
| 6,471,412 B1 * | 10/2002 | Belenkiy et al. | ................. | 385/53 |
| 6,554,482 B1 * | 4/2003 | Matasek et al. | .................. | 385/55 |
| 6,581,264 B2 * | 6/2003 | Ohori et al. | .................... | 29/426.1 |
| 6,595,696 B1 * | 7/2003 | Zellak | .............................. | 385/72 |
| 6,685,362 B2 * | 2/2004 | Burkholder et al. | ............. | 385/78 |
| 6,793,399 B1 * | 9/2004 | Nguyen | ........................... | 385/53 |
| 7,315,682 B1 * | 1/2008 | En Lin et al. | .................. | 385/139 |
| 7,661,887 B2 * | 2/2010 | Nakagawa | ....................... | 385/70 |
| 7,703,987 B2 * | 4/2010 | Kramer et al. | ................... | 385/55 |
| 7,837,395 B2 * | 11/2010 | Lin et al. | ......................... | 385/58 |
| 2002/0178568 A1 * | 12/2002 | Ohori et al. | .................... | 29/426.5 |
| 2004/0033030 A1 * | 2/2004 | Ohbayashi et al. | ............. | 385/88 |
| 2004/0223701 A1 * | 11/2004 | Tanaka et al. | ................... | 385/55 |

(Continued)

*Primary Examiner* — K. Cyrus Kianni

(74) *Attorney, Agent, or Firm* — Lowe Hauptman & Ham, LLP

(57) ABSTRACT

A protect cap for an optical fiber adapter according to the present disclosure is provided. The protect cap includes a casing defining a passage for receiving the optical fiber adapter, a pair of supporting lugs formed on the casing, a covering lid, and a pair of supporting arms extending from the covering lid. Each of the supporting lugs defines a shaft hole. Each of the supporting arms is provided with a shaft, wherein the shafts are positioned in the shaft holes, respectively such that the covering lid is pivotally connected to the casing. A first protrusion is formed on one of the shafts and a second protrusion is formed on an inner surface of one of the shaft holes. When the shafts are rotated to bring the first protrusion into contact with the second protrusion, the covering lid is kept in an open position with respect to the casing.

2 Claims, 5 Drawing Sheets

(56) References Cited

U.S. PATENT DOCUMENTS

| | | | |
|---|---|---|---|
| 2005/0008300 A1* | 1/2005 | Kamarauskas et al. | 385/55 |
| 2005/0226588 A1* | 10/2005 | Pons | 385/135 |
| 2005/0249440 A1* | 11/2005 | Yokoo | 384/100 |
| 2005/0286833 A1* | 12/2005 | Kramer et al. | 385/55 |
| 2007/0019265 A1* | 1/2007 | Park et al. | 359/18 |
| 2007/0019913 A1* | 1/2007 | Iwai et al. | 385/56 |
| 2007/0117457 A1* | 5/2007 | Kramer et al. | 439/595 |
| 2007/0217749 A1* | 9/2007 | Jong et al. | 385/88 |
| 2008/0247709 A1* | 10/2008 | Eguchi et al. | 385/60 |
| 2009/0226141 A1* | 9/2009 | Lin et al. | 385/134 |
| 2010/0054665 A1* | 3/2010 | Jones et al. | 385/59 |
| 2010/0251769 A1* | 10/2010 | Samuels | 63/23 |
| 2011/0038581 A1* | 2/2011 | Mudd et al. | 385/53 |

* cited by examiner

PROTECTION CAP FOR OPTICAL FIBER ADAPTER

CROSS REFERENCE TO RELATED APPLICATION

This application claims the priority benefit of China Patent Application Serial Number 201110332114.2 filed Oct. 27, 2011, the full disclosure of which is incorporated herein by reference.

BACKGROUND OF THE INVENTION

1. Field of the Invention

The present invention relates to a protection cap, and more particularly, to a protection cap for an optical fiber adapter.

2. Description of the Related Art

Recently, the optical fiber has been widely used as signal transmission media because of its high bandwidth and low loss nature. Often, fiber ends may be damaged by adverse environmental hazards, particularly at the location where optical fibers terminate in connectors. In particular, dust, dirt, and debris may impair the optical transmission capabilities of the fiber. Also, since a laser beam passes through the fiber, an operator's eyes may easily be injured while the connector is not in use or is not covered. Hence, the mating end of a fiber connector is often covered when not in use or not connected.

SUMMARY OF THE INVENTION

The present disclosure provides a protection cap for an optical fiber adapter.

In one embodiment, the protection cap of the present disclosure includes a casing defining a passage for receiving the optical fiber adapter, a pair of supporting lugs formed on the casing, a covering lid, and a pair of supporting arms extending from the covering lid. Each of the supporting lugs defines a shaft hole. Each of the supporting arms is provided with a shaft, wherein the shafts are positioned in the shaft holes, respectively such that the covering lid is pivotally connected to the casing. A first protrusion is formed on one of the shafts and a second protrusion is formed on an inner surface of one of the shaft holes. When the shafts are rotated to bring the first protrusion into contact with the second protrusion, the covering lid is kept in an open position with respect to the casing.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
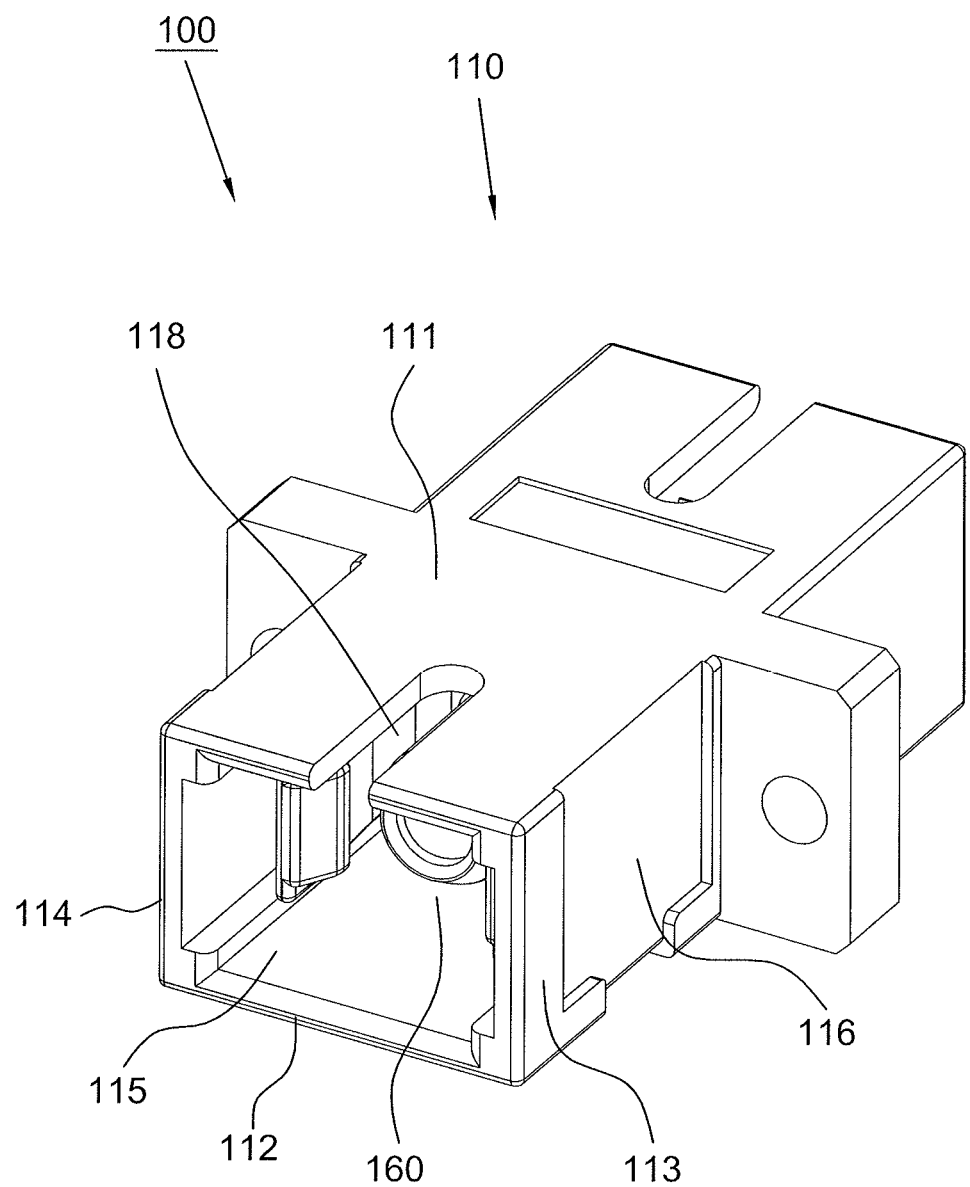
FIG. 1 is an elevated perspective view of a conventional SC type optical fiber adapter.

Referring to FIG. 1, a conventional optical fiber adapter 100 includes a molded main body 110. The main body 110 is of rectangular shape and has an axial accommodation room 115 defined by a top side-wall 111, a bottom side-wall 112, a right side-wall 113 and a left side-wall 114. An inner housing 160 is placed within the accommodation room 115. A guiding slot 118 is defined in the top side-wall 111. A recess 116 is formed on each of the right side-wall 113 and the left side-wall 114.

Figure 2:
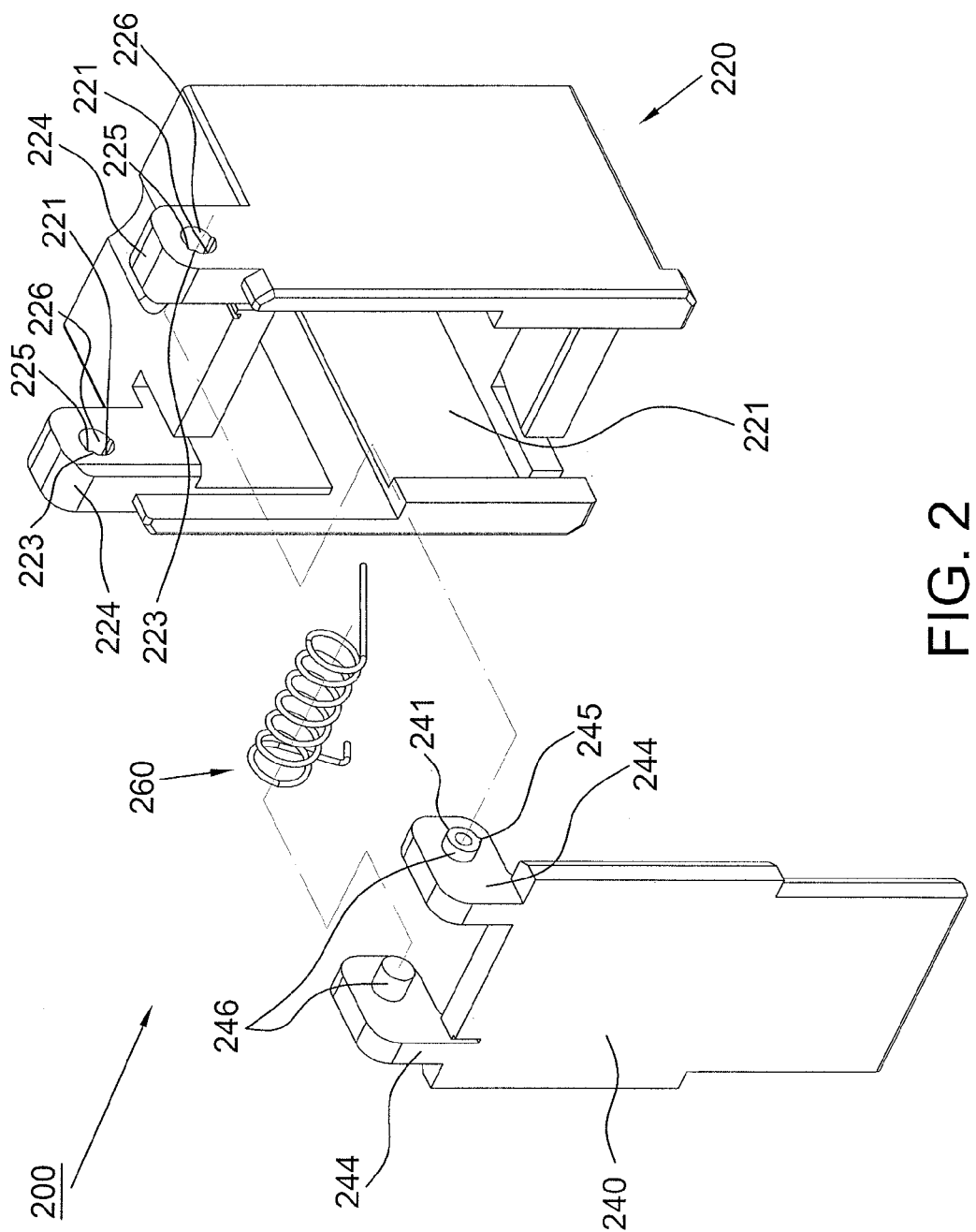
FIG. 2 is an exploded perspective view of a protection cap according to the present disclosure.
Figure 3:
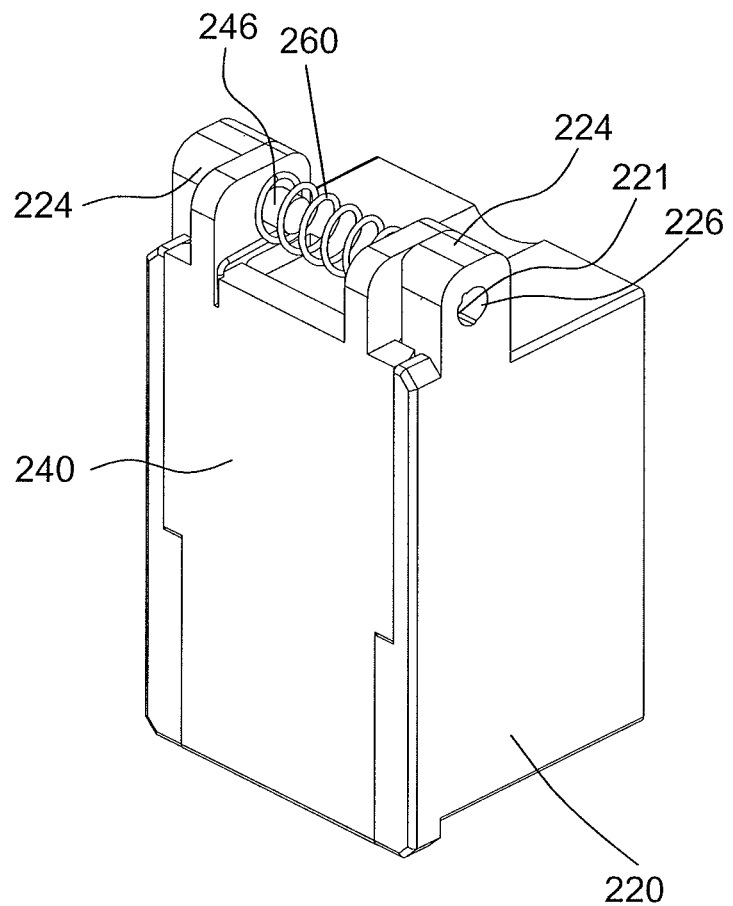
FIG. 3 is an elevated perspective view of a protection cap according to the present disclosure.

Referring to FIGS. 2 and 3, the protection cap 200 for an optical fiber adapter according to the present disclosure includes a casing 220, a covering lid 240 pivotally connected to the casing 220, and a coil spring 260 exerting a force on the covering lid 240. The casing 220 defines a passage 221 for receiving the main body 110 of the optical fiber adapter 100 A pair of supporting lugs 224 is formed on the casing 220 and each of the supporting lugs 224 defines a shaft hole 226. The covering lid 240 includes a pair of supporting arms 244 extending from an edge thereof. Each of the supporting arms 244 is provided with a shaft 246. The shafts 246 are positioned in the shaft holes 226, respectively. By this arrangement, the covering lid 240 is pivotally assembled to the supporting lugs 224 of the casing 220. One end of the spring 260 is anchored on the casing 220 and the other end is anchored on the covering lid 240. When the coil spring 260 is assemble to the shafts 246, the covering lid 240 will be forced to enclose an end of the passage 221 of the casing 220.

Figure 4A:
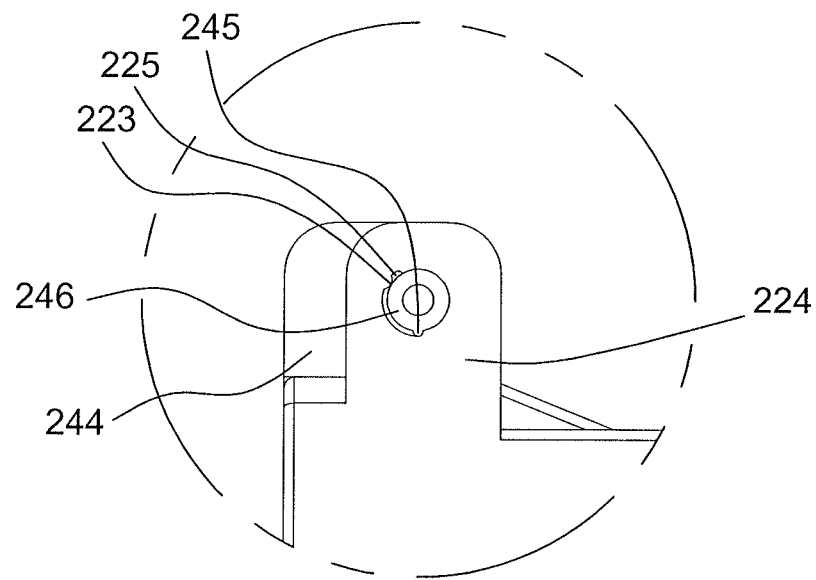
FIG. 4a is a locally enlarged view of FIG. 3.
Figure 4B:
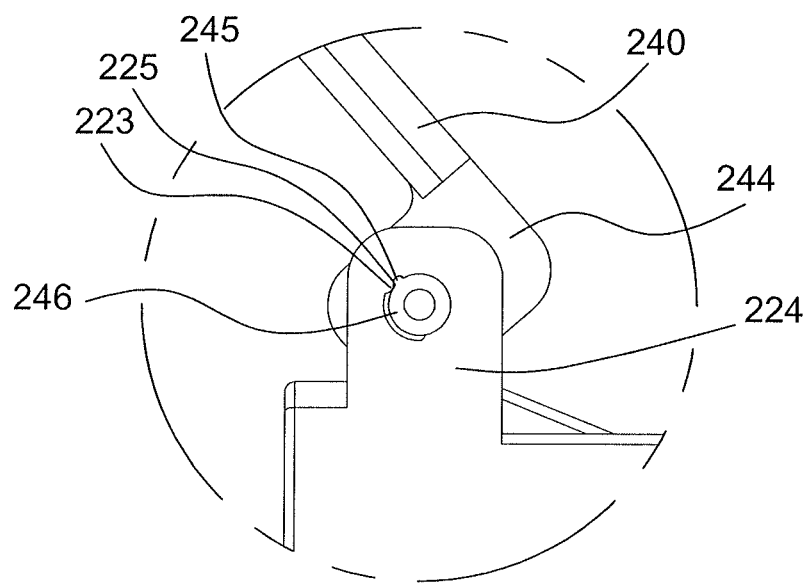
FIG. 4b is a locally enlarged view of FIG. 3, wherein the protrusion on the shaft is positioned in the indentation on the inner surface of the shaft hole.

Referring to FIGS. 2, 4a and 4b, the shafts 246 are generally circular, and at least one of the shafts 246 is provided with a protrusion 245 formed on a lateral surface 241 thereof. The shaft holes 226 are generally circular, and a protrusion 223 is formed on an inner surface 221 of at least one of the shaft holes 226. An indentation 225 is formed on the inner surface 221 and adjacent to the protrusion 223 for receiving the protrusion 245 of the shaft 246.

Figure 5:
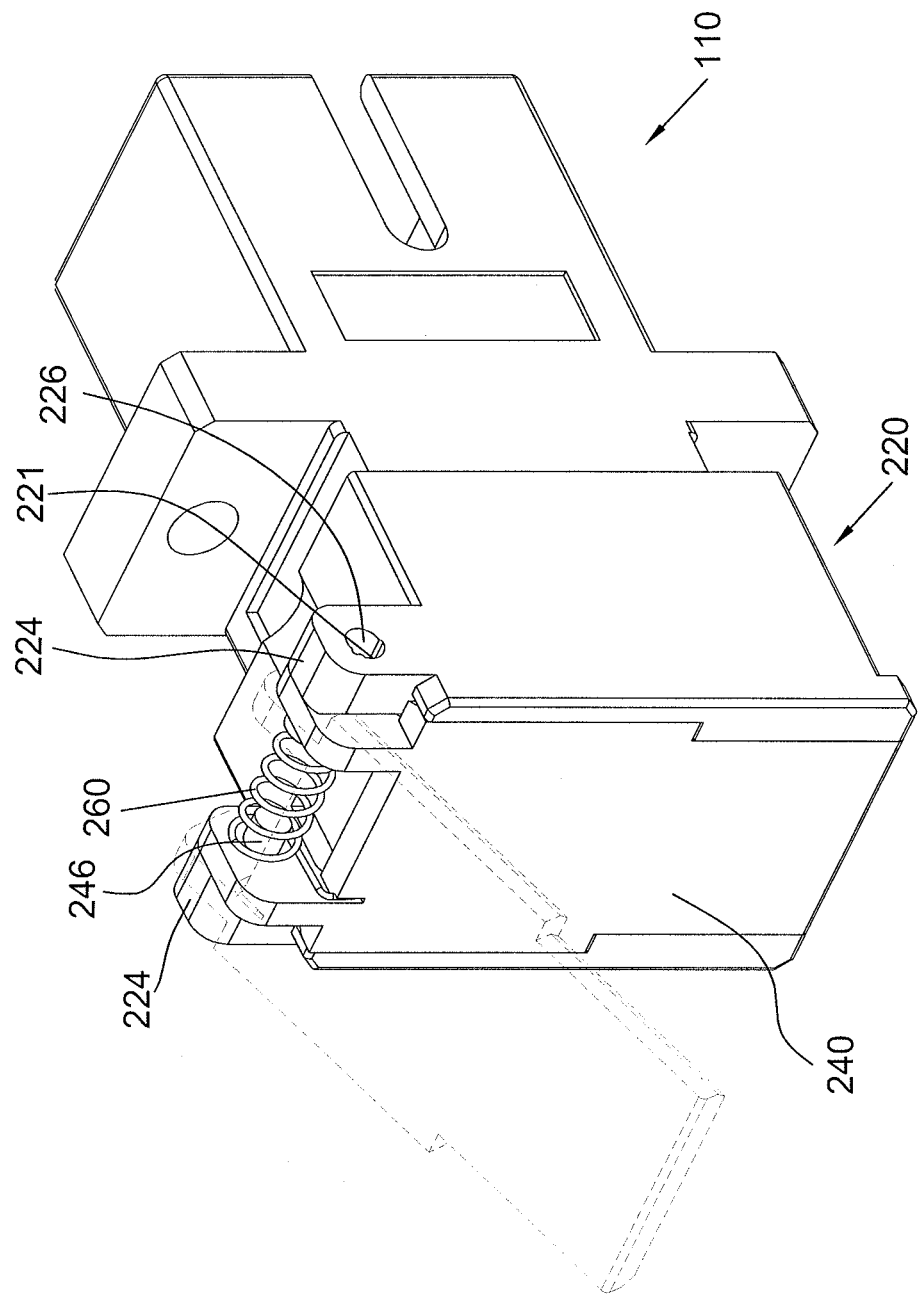
FIG. 5 illustrates the protection cap of the present disclosure is assembled to the optical fiber adapter of FIG. 1.

Referring to FIGS. 5, 4a and 4b, the coil spring 260 forces the covering lid 240 to be pivoted to a closed position to enclose the end of the passage 221 of the casing 220. When the covering lid 240 is lifted up, the shafts 246 together with the protrusion 245 will rotate clockwise accordingly. When the covering lid 240 continues to be lifted up, the protrusion 245 on the shaft 246 will slide on the protrusion 223. After the protrusion 245 passes the protrusion 223, it will arrive at the indentation 225 (see FIG. 4b). If the lifting-up force is removed at this moment, the coil spring 260 will force the covering lid 240 to rotate counterclockwise and bring the protrusion 245 into contact with the protrusion 223 on the inner surface 221 of the shaft hole 226. The protrusion 223 stops the rotation of the covering lid 240 and keeps the covering lid 240 in an open position. If desiring to enclose the passage 221 of the casing 220, a user may exert a lowering-down force on the covering lid 240 to rotate counterclockwise the shafts 246 such that the protrusion 245 is moved over the protrusion 223 in an opposite direction. Afterward, the coil spring 260 will help the covering lid 240 to enclose the passage 221 of the casing 220.

When the protection cap 200 is assembled to the main body 110, the guiding slot 118 and the axial accommodation 115 are completely sealed by the protection cap 200. Therefore, this arrangement may prevent the axial accommodation 115 from dust and dirt. Also, the laser beam emitted from the axial accommodation 115 may be obstructed. In addition, the covering lid 240 may be opened for insertion of an optical fiber connector (not shown) into the axial accommodation 115. There is no need to detach the protection cap 200 from the optical fiber adapter 100. Upon pulling out the connector, the covering lid 240 will resume the closed position.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A protection cap for an optical fiber adapter, comprising:
   a casing defining a passage for receiving the optical fiber adapter;
   a pair of supporting lugs formed on the casing, wherein each of the supporting lugs defines a shaft hole;
   a covering lid configured to enclose an end of the passage of the casing; and
   a pair of supporting arms extending from the covering lid, wherein each of the supporting arms is provided with a shaft, the shafts are positioned in the shaft holes, respectively such that the covering lid is pivotally connected to the casing;
   wherein a first protrusion is formed on one of the shafts and a second protrusion is formed on an inner surface of one of the shaft holes, wherein when the shafts are rotated to bring the first protrusion into contact with the second protrusion, the covering lid is kept in an open position with respect to the casing wherein an indentation is formed on the inner surface of the shaft hole for receiving the first protrusion.

2. The protection cap as claimed in claim 1, further comprising a spring positioned to force the covering lid to enclose the end of the passage of the casing.

\* \* \* \* \*